United States Patent
Xu

(10) Patent No.: US 11,481,375 B2
(45) Date of Patent: Oct. 25, 2022

(54) POINT-TO-POINT DISTRIBUTED DECENTRALIZED SYSTEM

(71) Applicant: Apifiny Group Inc., New York, NY (US)

(72) Inventor: Maodong Xu, Mill Neck, NJ (US)

(73) Assignee: APIFINY GROUP INC., New York, NY (US)

(*) Notice: Subject to any disclaimer, the term of this patent is extended or adjusted under 35 U.S.C. 154(b) by 145 days.

(21) Appl. No.: 16/578,176

(22) Filed: Sep. 20, 2019

(65) Prior Publication Data
US 2020/0250168 A1    Aug. 6, 2020

Related U.S. Application Data

(60) Provisional application No. 62/799,662, filed on Jan. 31, 2019.

(51) Int. Cl.
*G06F 16/23* (2019.01)
*G06Q 20/36* (2012.01)

(52) U.S. Cl.
CPC ..... *G06F 16/2336* (2019.01); *G06Q 20/3678* (2013.01); *G06Q 2220/00* (2013.01)

(58) Field of Classification Search
CPC .......... G06F 16/2336; G06Q 20/02; G06Q 20/3678; G06Q 2220/00; H04L 67/1095; H04L 63/12; H04L 9/321; H04L 2209/38; H04L 2209/56; H04L 9/3239
See application file for complete search history.

(56) References Cited

U.S. PATENT DOCUMENTS

| 11,049,148 | B2* | 6/2021 | Lawbaugh | G06Q 30/0254 |
| 2017/0046689 | A1* | 2/2017 | Lohe | G06Q 20/40 |
| 2019/0013933 | A1* | 1/2019 | Mercuri | G06F 16/904 |
| 2019/0027237 | A1* | 1/2019 | McFarlane | H04L 9/3247 |
| 2019/0377724 | A1* | 12/2019 | Pennington | G06Q 20/223 |

(Continued)

OTHER PUBLICATIONS

Taherkordi et al., "Pervasive Smart Contracts for Blockchains in IoT Systems", ICBTA 2018: Proceedings of the 2018 International Conference on Blockchain Technology and ApplicationDec. 2018 pp. 6-11https://doi.org/10.1145/3301403.3301405 (Year: 2018).*

(Continued)

*Primary Examiner* — Mark D Featherstone
*Assistant Examiner* — Kweku William Halm
(74) *Attorney, Agent, or Firm* — Lewis Roca Rothgerber Christie LLP

(57) ABSTRACT

Embodiments relate to high throughput blockchain systems that can handle large numbers of real-time operations. A system may include a server that handles the matching of operations in a quick and trusted manner and a blockchain that executes the matched operations in a decentralized manner after the matching is confirmed by the server. The server may receive an operation request from a user. To confirm the operation request, the user may cause a broadcast of entry on the blockchain that confirms the validity of the operation request. Upon verifying the operation request, the server may match the operation request with other operation requests that meet the criteria specified by the user's request. A set of code instructions recorded on the blockchain may generate one or more entries that execute the operations related to the match.

18 Claims, 8 Drawing Sheets

(56) References Cited

U.S. PATENT DOCUMENTS

| | | | |
|---|---|---|---|
| 2020/0044857 A1* | 2/2020 | Snow | G06F 21/53 |
| 2020/0074552 A1* | 3/2020 | Shier | G06Q 20/10 |
| 2020/0133955 A1* | 4/2020 | Padmanabhan | G06F 16/2379 |
| 2020/0366495 A1* | 11/2020 | Mahoney | H04L 9/12 |
| 2021/0082045 A1* | 3/2021 | Assia | G06F 16/2379 |

OTHER PUBLICATIONS

Fabian Schuh, "Graphene Documentation" pp. 10, 38, 55, 233, 306 an 312 (Year: 2017).*
Fabian Schuh "Graphene Documentation Details", pp. 5-309 (Year: 2017).*
Fabian Shuch, "Graphene Documentation" pp. 5-309 (Year: 2017).*
BitShares Blockchain Foundation, "The BitShares Blockchain," Jun. 2018, 4 pages.
Schuh, F., "Graphene Documentation," Oct. 5, 2017, 380 pages.

* cited by examiner

POINT-TO-POINT DISTRIBUTED DECENTRALIZED SYSTEM

CROSS-REFERENCE TO RELATED APPLICATION

The present application claims the benefit of U.S. Provisional Patent Application No. 62/799,662, filed on Jan. 31, 2019, which is hereby incorporated by reference in its entirety.

TECHNICAL FIELD

The disclosure generally relates to providing point-to-point secured operations in a decentralized system.

BACKGROUND

A decentralized system allows operations to take place in a secured fashion without a central authority to reduce risks associated with the failure of the trusted authority. A decentralized system often relies on a blockchain to reach consensus among nodes of the decentralized system. A blockchain may include a chain of data blocks that are linked together through hashes of previous blocks. Various participants in the blockchain may independently verify the validity of a transaction by tracing through the history of the chain of transactions. In a public blockchain, different parties may independently verify the blocks recorded on the chain so that it becomes very challenging for a single party to manipulate or forge a transaction stored in a block. As such, a blockchain often provides greater transparency, enhanced security, and improved traceability than a centralized system.

However, operating a decentralized system is not without drawbacks. For example, in a decentralized system, the operations are often driven by block generations of the blockchain. For a new operation to be completed, the nodes in the decentralized system may need to wait for not only a new block to be generated but also multiple confirmations of the blocks to avoid a new branch of blocks that turns out to be the actual chain. As such, operations related to a blockchain could be severely limited by the block-generation speed and the confirmation speed of the blockchain, which may sometimes be extremely slow compared to the nature of the operations. As a result, a decentralized system could have a low processing performance. A conventional blockchain is often not suited for handling a large number of concurrent real-time operations.

SUMMARY

Embodiments relate to high throughput blockchain systems that can handle large numbers of real-time operations. In one embodiment, a system may include a server that handles the matching of operations in a quick and trusted manner and a blockchain that executes the matched operations in a decentralized manner after the matching is confirmed by the server. The blockchain may generate new blocks by a voting process among the distributed nodes to further increase the operational speed of the system. In one embodiment, the server may receive an operation request from a user. To confirm the operation request, the user may cause a broadcast of entry on the blockchain that confirms the validity of the operation request. Upon verifying the operation request, the server may match the operation request with other operation requests that meet the criteria specified by the user's request. The server may use its private key to create a digital signature of the confirmation of the match and transmit the confirmation with the digital signature to a set of code instructions recorded on the blockchain. Upon verification of the confirmation, the code instructions may generate one or more entries that execute the operations related to the match. The entries may be broadcasted to the network of nodes in the blockchain and confirmed when the entries are recorded in one of the blocks in the blockchain.

Figure 1:
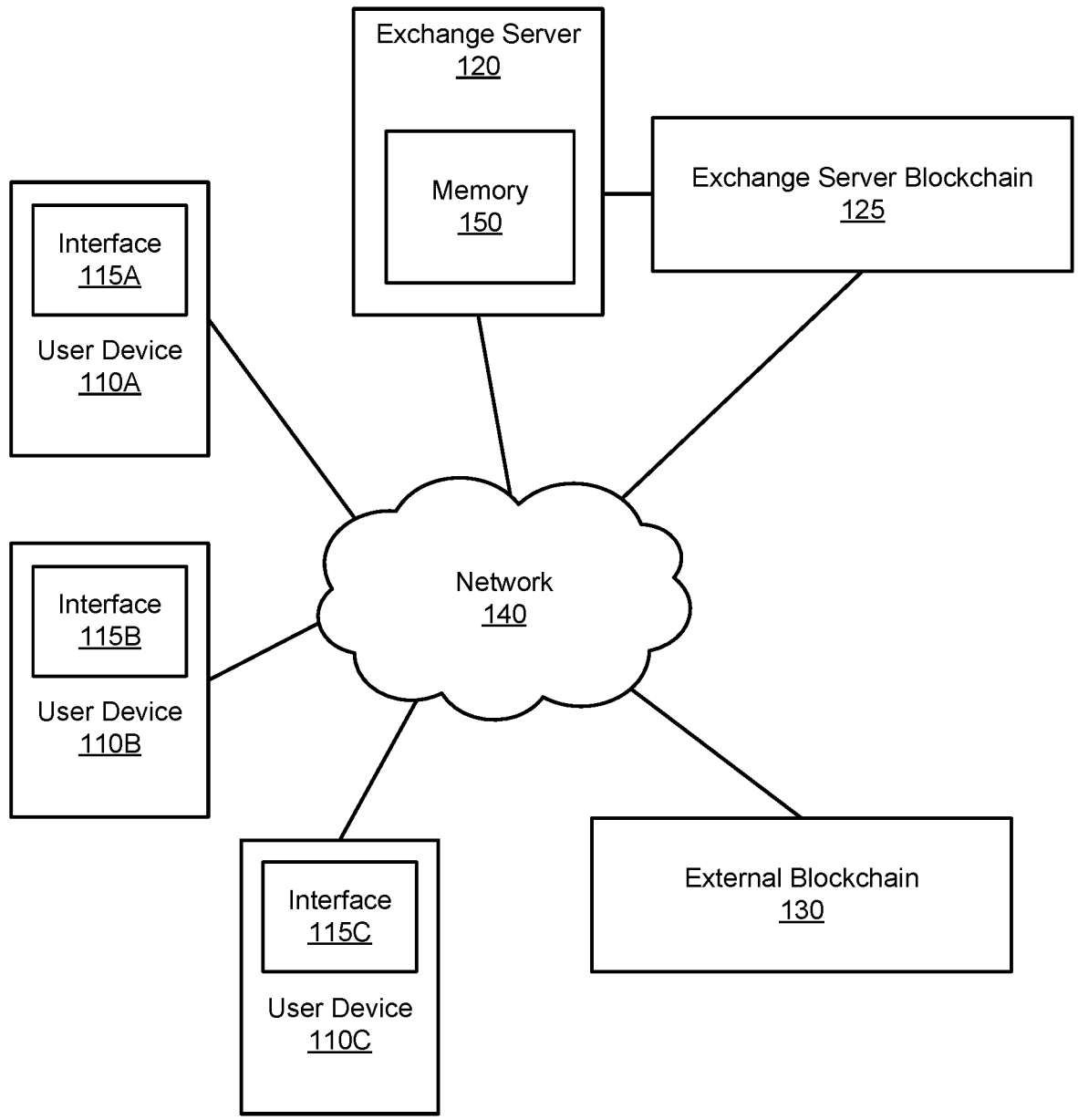
FIG. 1 illustrates an example blockchain exchange server system environment, in accordance with an embodiment.

The figures depict, and the detail description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In one embodiment, a computer-implemented method is described. The computer-implemented method may include receiving, from a user, a first order for a request to exchange a blockchain depository receipt through a first blockchain. The blockchain depository receipt may be recorded on the first blockchain as a depository receipt of an external blockchain unit that is recorded on a second blockchain. The computer-implemented method also may include verifying that an entry, which specifies that the blockchain depository receipt is sent to a custody address of a first smart contract, is recorded on the first blockchain. The first smart contract may include a first set of code instructions that are recorded on the first blockchain. The code instructions may maintain the custody of the blockchain depository receipt pursuant to the first order. The computer-implemented method may further include matching, by the exchange server, the first order with a second order to generate a match. The computer-implemented method may further include transmitting a confirmation of the match to the first smart contract to cause the code instructions to generate a broadcast of a blockchain transaction to be recorded on the first blockchain. The blockchain transaction may specify a transfer of the blockchain depository receipt from the user's address to another blockchain address of the first blockchain.

In one embodiment, a non-transitory computer readable medium that stores program codes including code instructions recorded on a first blockchain. The code instructions, when executed, cause one or more processors to perform steps that include receiving a blockchain depository receipt to be put into custody. The custody may be maintained pursuant to a first order that is created by a user for a request to exchange the blockchain depository receipt. The blockchain depository receipt may be recorded on the first blockchain as a depository receipt of an external blockchain unit that is recorded on a second blockchain. The steps also may include receiving, from the exchange server, a match between the first order and a second order. The steps further may include generating, responsive to the match, a broadcast of a blockchain transaction to be recorded on the first blockchain. The blockchain transaction may specify a transfer of the blockchain depository receipt from the user's address to another blockchain address of the first blockchain.

In one embodiment, a system is described. The system may include an exchange server and a set of code instructions in communication with the exchange server. The exchange server may be configured to receive, from a user, a first order for a request to exchange a blockchain depository receipt through a first blockchain. The blockchain depository receipt may be recorded on the first blockchain as a depository receipt of an external blockchain unit that is recorded on a second blockchain. The exchange server also may be configured to verify that an entry, which specifies that the blockchain depository receipt is sent to a custody address, is recorded on the first blockchain. The exchange server may be further configured to match the first order with a second order to generate a match. The set of code instructions may be recorded on the first blockchain. The set of code instructions, when executed, may cause one or more processors to receive a confirmation of the match from the exchange server and to generate a broadcast of a blockchain transaction to be recorded on the first blockchain. The blockchain transaction may specify a transfer of the blockchain depository receipt from the user's address to another blockchain address of the first blockchain.

System Overview

Referring now to FIG. 1, a block diagram that illustrates an example blockchain system environment 100 is shown, in accordance with an embodiment. By way of example, the blockchain system environment 100 includes one or more user devices, e.g., 110A, 110B, 110C, etc. (collectively referred to as user devices 110 or a user device 110), an exchange server 120, one or more blockchains 125 and 130. The blockchains may include a first blockchain that is associated with the exchanger server 120, which may be referred to as an exchange server blockchain 125, and a second blockchain, which may be an external public blockchain 125. The entities and components in the environment 100 communicate with each other through the network 140. In various embodiments, the blockchain system environment 100 may include different, fewer, or additional components. The components in the blockchain system environment 100 may each correspond to a separate and independent entity or may be controlled by the same entity. In some cases, some of the components in the environment 100 may communicate with each other through local network connections.

A user device 110 may be controlled by a user having an account of the exchange server 120. The user devices 110 may be any computing device. Examples of user devices 110 include personal computers (PC), desktop computers, laptop computers, tablet computers, smartphones, wearable electronic devices such as smartwatches, or any other suitable electronic devices. A user may have an account with the exchange server 120, which is used to track the balance of various blockchain units such as cryptocurrencies, tokens, blockchain depository receipts, and other suitable blockchain units. Any user device 110 may participate in one or more blockchains to serve as nodes that are involved in the mining or voting processes and also to serve as a part of virtual machines of the blockchain networks.

The user devices 110A, 110B, and 110C each may include an interface 115A, 115B, or 115C (collectively referred to as interfaces 115 or an interface 115). An interface 115 may communicate with the exchange server 120 and be run at a user device 110. When the user device 110 attempts to initiate a transaction of a blockchain unit (e.g., a deposit request, a transfer request, a purchase order, a sell order, etc.), the user may communicate to the exchange server 120 through the interface 115. The interface 115 may take different forms. In one embodiment, the interface 115 is a software application interface that is provided and controlled by the exchange server 120. For example, the exchange server 120 may provide a front-end software application that can be displayed at a user device 110. In one case, the front-end software application is a software application that can be download and installed at user devices 110 for the user to initiate and manage transactions, check balances, and perform other related actions. In another case, the front-end software application takes the form of a webpage interface of the exchange server 120 that allows clients to manage their accounts through web browsers. The front-end software application may include a graphical user interface (GUI) that displays various information and graphical elements. In another embodiment, interface 115 may not include graphical elements but may communicate with the exchange server 120 via other suitable ways such as application program interfaces (APIs).

An exchange server 120 may be a centralized server that provides various exchange and asset management services to the users. The services provided by the exchange server 120 may include digital wallet, pricing information, asset exchange, trusted asset deposit, blockchain unit trading, matching of orders, blockchain management, smart contract generation, and data feed. In one embodiment, the exchange server 120 may be partially centralized and partially decentralized. For example, the services related to matching orders may be centralized. The exchange server 120 may also provide blockchain transactions that are decentralized or that rely on a decentralized blockchain, such as the exchange server blockchain 125. The details of the operations and sub-components of the exchange server 120 will be further discussed in association with FIG. 2.

In one embodiment, the exchange server 120 includes a memory 150 that stores transaction orders submitted by various users. The orders may be purchase orders, sell orders, or other suitable orders that include the price, quantity of blockchain units. The exchange server 120 may provide off-chain matchmaking to generate one or more matches of orders that are stored in the memory 150. The final matchmaking results will be recorded asynchronously to the memory 150 or a sub-chain of the exchange server blockchain 125 for public reference and audit.

The system environment 100 may include one or more blockchains 125 and 130. The first blockchain 125 may be referred to as an exchange server blockchain 125. In one embodiment, the first blockchain 125 may be a public blockchain that is decentralized. In this context, the blockchain 125 may be associated with the exchange server 120. For example, the exchange server blockchain 125 may include a namespace convention that is reserved for the blockchain units that are traded through the exchange server 120 so that the blockchain units may only be circulated within the exchange server 120. In one embodiment, the exchange server blockchain 125 is a public blockchain that includes a plurality of nodes that cooperate to verify transactions and to generate new blocks. The exchange server 120 may initially develop, launch, set standards for, and maintain the exchange server blockchain 125 (e.g., responsible or partially responsible updating versions of the blockchain) but the exchange server blockchain 125 may allow the public to participate as the nodes of the blockchain network. Alternative to a fully public blockchain, in one embodiment the exchange server blockchain 125 may restrict at least a certain minimum level of nodes to the account holders of the exchange server 120. The generation of new blocks for the exchange server blockchain 125 may be performed by any suitable methods as discussed in association with FIGS. 7A and 7B. In one embodiment, the generation of new blocks may be conducted through a voting process in which, in each round, a subset of the nodes that are randomly or partially randomly selected are given the voting right to decide which node may generate a new block. The voting process, in general, generates new blocks in a much faster rate than a mining process, which often involves nodes taking a significant amount of time in mining a new block.

The exchange server blockchain 125 also may be associated with the exchange server 120 in a sense that the exchange server blockchain 125 may design and record one or more smart contracts for executions of actions for the exchange server 120. A smart contract may be a collection of code instructions (e.g., its functions) and data (e.g., its states) that reside at a specific address of a blockchain. For example, a smart contract may include a set of code instructions that are immutable stored on the blockchain and are executable when one or more conditions are met. When triggered, the set of code instructions may be executed by a computer such as a virtual machine of the blockchain. Here, a computer may be a single operation unit in a conventional sense (e.g., a single personal computer) or may be a set of distributed computing devices that cooperate to execute the code instructions (e.g., a virtual machine or a distributed computing system). In one embodiment, the exchange server blockchain 125 includes one or more smart contracts that execute orders stored in memory 150 and matched by the exchange server 120.

The exchange server blockchain 125 also may be associated with the exchange server 120 by including one or more private side-chains that are managed by the exchange server 120. For example, one of the side-chains controlled by the exchange server 120 may serve as a centralized ledger of the exchange server 120. In one embodiment, for the operations and orders that are matched by exchange server 120, the orders may be posted on the side-chains for reference and verification purposes. The operations and orders may be executed by the smart contracts that are recorded in the main public chain. The execution of orders may include transferring of blockchain units from one user's address to another address.

In different embodiments, the degree of decentralization of the exchange server blockchain 125 may vary. The exchange server blockchain 125 may be a public blockchain, a consortium blockchain, a private blockchain. In one embodiment, the exchange server blockchain 125 may be a consortium blockchain. The exchange server 120 may serve as a node of the blockchain network and may limit other nodes of the blockchain network to users of the exchange server 120 and other authorized parties. Hence, the exchange server 120 may restrict the parties who can participate in the mining process and the data recordation and verification process of the exchange server blockchain 125. In another embodiment, the exchange server 120 may set the standard and publish the exchange server blockchain 125, but allows the public to freely participate in the blockchain network.

The second blockchain 130 may be similar to or different from the first blockchain 125. For example, the second blockchain 130 also may support smart contracts. In one case, the second blockchain 130 may be an existing blockchain such as BITCOIN, ETHEREUM, EOS, NEO, CARDANO, STELLER, etc. In one embodiment, the second blockchain 125 may generate a new block using a mining process that may be slow for the blockchain 125 to sustain a throughput for a large volume of transactions and order matching. Yet in another embodiment, the second blockchain 125 may also use a voting process to generate a new block. The second blockchain 130 may issue and record one or more blockchain units that are external to the first blockchain 125. The blockchain units may be external to the first blockchain 125 where the blockchain units may not be native to the first blockchain 125 and the transactions of the blockchain units are recorded in the second blockchain 130 instead of the first blockchain 125. In this context, the second blockchain may be referred to as an external blockchain 130. For example, the external blockchain 130 may be ETHEREUM that generates blockchain units such as ETHER and other tokens, which may be external to the first blockchain 125. The exchange server blockchain 125 may record transactions of the external blockchain units through depository receipts that represent various quantities of the external blockchain units.

The communication among the user devices 110, the exchange server 120, and the blockchains 125 and 130 may be carried out via a network 140, for example, via the Internet. In one embodiment, the network 140 uses standard communications technologies and/or protocols. Thus, the network 140 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. The components in environment 100 may send information, data, and messages through one or more packets.

Example Exchange Server

Figure 2:
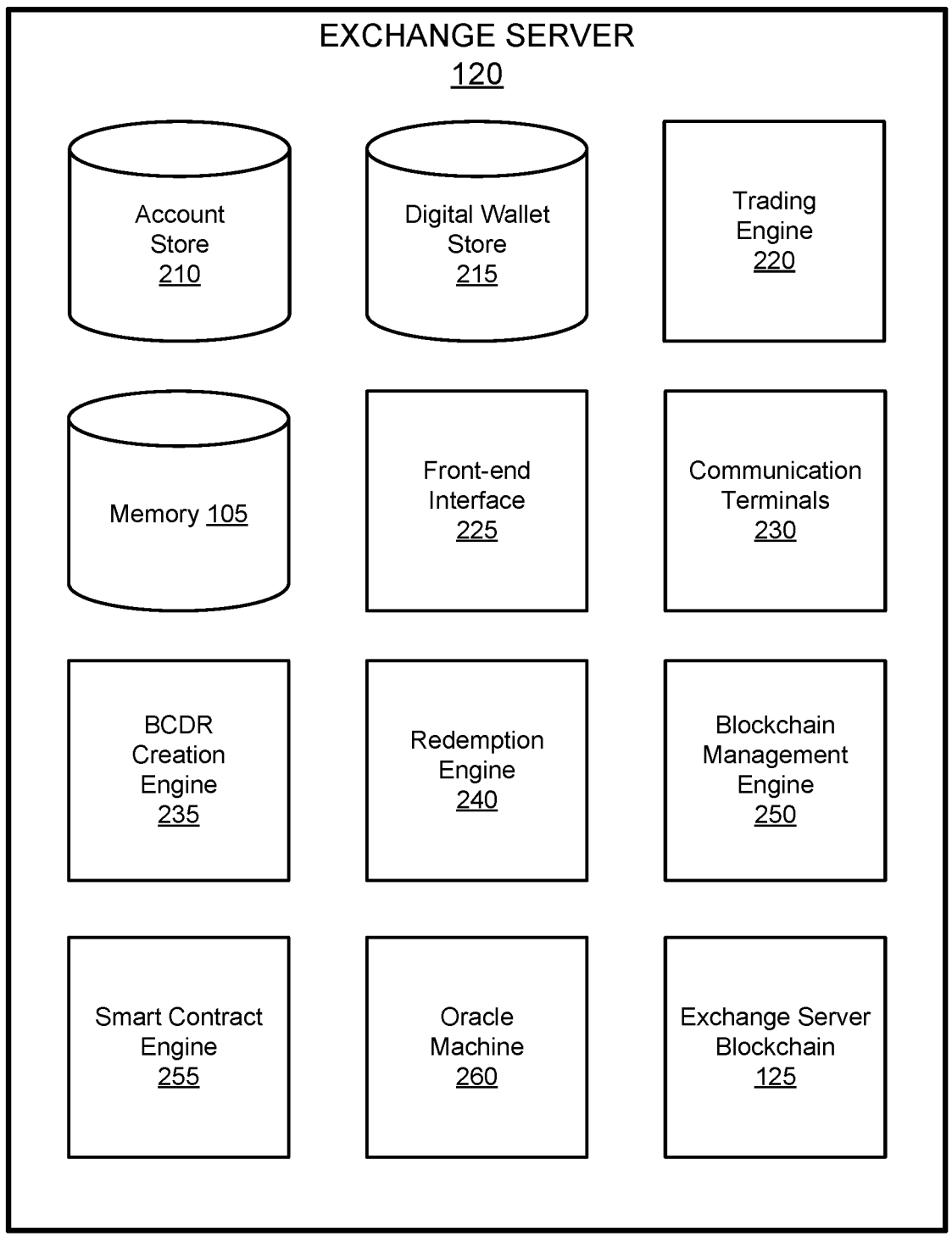
FIG. 2 is a block diagram illustrating various components of an exchange server, in accordance with an embodiment.

FIG. 2 is a block diagram representing an example exchange server 120, in accordance with an embodiment. In the embodiment shown in FIG. 2, the exchange server 120 includes an account store 210, a digital wallet store 215, the memory 105, a trading engine 220, a front-end interface 225, a communication terminal 230, a blockchain depository receipt (BCDR) creation engine 235, a redemption engine 240, a blockchain management engine 250, a smart contract engine 255, and an oracle machine 260. In some embodiments, the exchange server blockchain 125 or its side-chain may also be managed by or be a part of the exchange server 120. In other embodiments, the exchange server blockchain 125 is a public blockchain. The functions of the exchange server 120 may be distributed among different components in a different manner than described. Also, in various embodiments, the exchange server 120 may include, different, fewer, and/or additional components.

According to one embodiment, the exchange server 120 may maintain user data in the account store 210. The account store 210 may associate a user with a unique identifier. The account may be used to hold various blockchain units such as cryptocurrency, tokens, and blockchain depository receipts. The user account keeps track of the user's holding of different blockchain units in various blockchains. For example, the exchange server 120 may maintain a ledger that is associated with the user identifier. Also, the exchange server 120 may examine the blocks in a blockchain and locate entries that are related to a particular user's blockchain address to determine the balance of the user's holding of a blockchain unit. A user account may keep track of various blockchain units such as BITCOIN, ETHER, RIPPLE, EOS and also tokens and depository receipts issued by the exchange server blockchain 125.

The digital wallet store 215 stores various blockchain unit balances of users and may hold the private keys of the users. A digital wallet for a user may be a blockchain cryptocurrency account that stores the balances of various cryptocurrencies that are traded on different blockchains. For each blockchain, the digital wallet may store a cryptographic private key for a user. The private keys for different blockchains may have different formats such as a different length of bits and may be in compliance with different cryptographic protocols. The private key allows the user to trade a cryptocurrency and proves that the user is the owner of a certain amount of cryptocurrency recorded on a blockchain. For example, the digital wallet maintains the private key as a secret of the user and may use the private key to derive a public key corresponding to the private key. The digital wallet may derive an address of the user for the blockchain from the public key. The address, which may be uniquely derived from the public key, may serve as a public yet anonymous identifier of the user in the blockchain. The digital wallet also may use the private key to generate a digital signature to initialize a transaction of the blockchain unit and use the digital signature as a proof of the owner of the address and validity of the transaction. In some embodiments, the digital wallet may use a master private key to generate multiple public keys so that the user may use different public addresses in various transactions on the blockchain.

The exchange server 120 may use the trading engine 220 to provide pricing information of blockchain units and also to match sell and purchase orders that are stored in the memory 105. The trading engine 220 may allow trading of various types of assets in the form of blockchain units representing the assets. The types of assets could include securities, fiat currencies, cryptocurrencies from other blockchains, blockchain tokens, tangible properties, real properties, and other suitable assets. The matching of orders may be conducted through the trading engine 220, which may be a centralized server. The execution of the matched orders and settlement of the transactions may be conducted through the exchange server blockchain 125, which may be a decentralized network. Various types of assets may be traded through the exchange server blockchain 125 in the form of depository receipts. For example, a depository receipt may represent a certain quantity of tangible property. In another case, a depository receipt that is recorded on the exchange server blockchain 125 may represent a certain quantity of an external blockchain unit that is recorded on a second blockchain. The trading engine 220, through possible centralized management, provides a fast order matching turn around for external blockchain units that are conventionally settled in a much slower speed due to the constrains, such as mining speed, of the second blockchain.

In some embodiments, while blockchain units in the form of depository receipts are traded through the exchange server blockchain 125, the trading engine 220 may provide pricing information of the assets represented by the depository receipts such as bid prices and ask prices in the unit of the assets. For example, the pricing information of a blockchain token (e.g., ETHER) may be presented in units of ETHER or US dollars even though the exchange using the exchange server blockchain 125 may be carried out by the deposit receipts of ETHER or US dollars instead of the actual assets. The pricing information may be based on the purchase and sell orders placed by different users of the exchange server 120. In some cases, the purchase and sell orders may not be in the same units. For example, a sell order may be specified in a unit of a first blockchain token while a purchase order may be in a unit of a second blockchain token. The trading engine 220 may provide conversion rate information among different blockchain units and may automatically match orders that have equivalent values but in different currencies or blockchain units.

The exchange server 120 may include one or more front-end interfaces 225. A front-end interface 225 allows users to manage their accounts, initiate transactions such as by placing a purchase or sell order, and perform various blockchain-related activities. A first example of the front-end interface 225 may be a software application interface that is installed on users' mobile devices such as smartphones and computers. A second example of the front-end interface 225 may be a webpage interface of the exchange server 120 that allows users to manage their accounts through web browsers. A third example of the front-end interface 225 may be an application program interface (API) of the exchange server 120 that allows users to initiate various transactions through program codes and algorithms.

The communication terminals 230 of the exchange server 120 provide network and blockchain connections between the exchange server 120 and various entities that communicate with the exchange server 120. The exchange server 120 may serve as a node of various public blockchains to participate in various voting, mining, transaction verification and block validation processes. When the exchange server 120 initiates various transactions through a blockchain, the communication terminal 230 may broadcast transactions to the nodes of the blockchain network for recordation. The broadcast transactions are recorded on one or more newly generated blocks in the blockchain and are verified after multiple subsequent blocks are linked to the block that records the transactions. The exchange server 120 may include different terminals such as blockchain terminal, trading webpage terminal, exchange server terminal, and fiduciary terminal. Each terminal may manage a data feed or a webpage that publishes information regarding the related services and server status. Each terminal may also include its individual API terminal.

The exchange server 120 serves as a trading platform of tradable assets (e.g., securities, external blockchain units, fiat currencies, etc.) that are tokenized as blockchain units. A quantity of a tradable asset (e.g., a certain share of company stock) may be represented by a blockchain depository receipt (BCDR) and be traded and transmitted through one or more blockchains. In some cases, the BCDR may also be referred to as a pass. In one embodiment, a pass may be a type of BCDR whose exchange is restricted within the exchange server 120. The BCDR creation engine 235 causes a generation BCDRs by smart contracts recorded on the exchange server blockchain 125 in response to users' deposit requests to convert tradable assets to blockchain units recorded on the exchange server blockchain 125. To establish trust for various users that a BCDR truly represents the underlying quantity of a tradable asset, the BCDR creation engine 235 may cause a generation of a digital signature. The generation of the digital signature may include applying a cryptographic private key to the identification information of a tokenization request that includes an identifier of the tradable asset to be tokenized and the quantity of the tradable asset. The BCDR creation engine may cause the digital signature to be transmitted to a smart contract recorded on a blockchain. The smart contract includes code instructions that are executable in response to verifying the digital signature. The code instructions, when executed, cause a computer to generate a BCDR.

For example, a quantity of an asset may be deposited in a smart contract address on the external blockchain, the exchange server 120, or a fiduciary. In return, the smart contracts, recorded in the exchange server blockchain 125, may generate a blockchain unit whose transactions are recorded in the exchange server blockchain 125. In one embodiment, the entry that generates the blockchain unit may include information specifying the deposit of the underlying assets and the quantity of the deposit. Hence, the entry may serve as a depository receipt for the underlying assets. The blockchain unit may be referred to as a blockchain depository receipt (BCDR). The deposit of an asset may take different forms. In one case, if the asset is a security, tangible property, or real property, the deposit may be held in trust by a fiduciary server. The details of the deposit and exchange of those asset classes are discussed in further detail in U.S. patent application Ser. No. 16/404,709, entitled "Trusted Tokenized Transactions in a Blockchain System," filed on May 6, 2019. The application is incorporated by reference for all purposes. In another case, if the asset is an external blockchain unit such as BITCOIN or ETHER, the deposit may include a user sending, through the external blockchain, the external blockchain unit to an address associated with a smart contract or an address associated with the exchange server 125. When the smart contract recorded in the exchange server blockchain 125 receives a confirmation of the deposit, the smart contract generates an entry specifying creation of the BCDR and broadcast the entry for recordation in the exchange server blockchain 125.

The exchange server 120 may allow users to redeem tradable assets that are represented by BCDRs. The redemption engine 240 may receive a redemption request from an owner. The transfer of the BCDR from the owner to the exchange server 120 may be performed through a recordation process. The redemption engine 240 transmits an equivalent quantity of the tradable asset represented by the BCDR to an account of the owner. The transfer may be carried out in different methods, depending on the type of assets. For example, if the asset is a security, the redemption engine 240 may transfer the security to a conventional stock account of the user. If the asset is an external blockchain, a smart contract saved on the external blockchain may broadcast an entry that specifies a transfer of a quantity of the blockchain unit to the user's address. When the transfer is completed, the redemption engine 240 may remove the BCDR by marking the identifier of the BCDR in a data store of the exchange server 120 as invalid or redeemed and/or recording the redemption on the exchange server blockchain 125. In other cases, the redemption engine 240 may reduce the total amount of issuance of a BCDR of a particular asset. For example, the exchange server 120 may keep track of the issuance of a BCDR of a particular stock. When a quantity of the BCDR representing the stock is redeemed, the redemption engine 240 may reduce the amount of issuance. The removal of the BCDR also may be performed through a blockchain. For example, the redemption engine 240 may cause a smart contract to remove the BCDR from the blockchain or to mark the BCDR as removed in a block of the blockchain.

Blockchain management engine 250 provides various functionalities for the exchange server 120 to perform activities on different blockchains that may have their own standards and protocols. The exchange server may serve as a node of a public blockchain to participate in the voting, mining, and data validation process. The blockchain management engine 250 may also allow exchange server 120 to broadcast various transactions to a blockchain network for recordation. In some cases, the blockchain management engine 250 may store various private keys of the exchange server 120 that allows the exchange server 120 to generate transactions for blockchain recordation and to accept a transfer of blockchain units through the exchange server's public address. The blockchain management engine 250 may also manage the broadcast of transactions that are initiated by the users of the exchange server 120. For example, the private keys of the user accounts may also be stored by the exchange server 120 so that the blockchain management engine 250 may broadcast transactions on behalf of the users.

The smart contract engine 255 manages the generation and triggering of various smart contracts that are recorded on different blockchains. A smart contract may be created through a particular programming language that is compatible with the blockchain. A smart contract may be immutably stored on a block of the blockchain. The recorded smart contract may include executable code instructions that are triggered by a certain condition. When the condition is met and verified, the code instructions are automatically executed by a computer to carry out the contract terms specified in the code instructions. The computer that executes the smart contract may take various forms. For example, a computer described herein may be a conventional personal computer, a virtual machine for the blockchain, or a collection of distributed nodes in distributed computing. When the code instructions of the smart contract are executed, the code instructions may cause certain events (e.g., a transaction, a generation of a token, a generation of a BCDR) to be recorded on a blockchain. The smart contract engine 255 may generate different smart contracts to be recorded on blockchains. The smart contract engine 255 also may cause the triggering of various recorded smart contracts when conditions are met.

The oracle machine 260 may serve as a data feed for one or more smart contracts. The oracle machine 260 may receive different data from various sources. For example, different parties may provide information and data to the oracle machine 260. When relevant information is obtained by the oracle machine 260, some code instructions of the smart contract may be triggered if certain conditions are met.

Example Cross-Chain Point-To-Point Transaction

Figure 3:
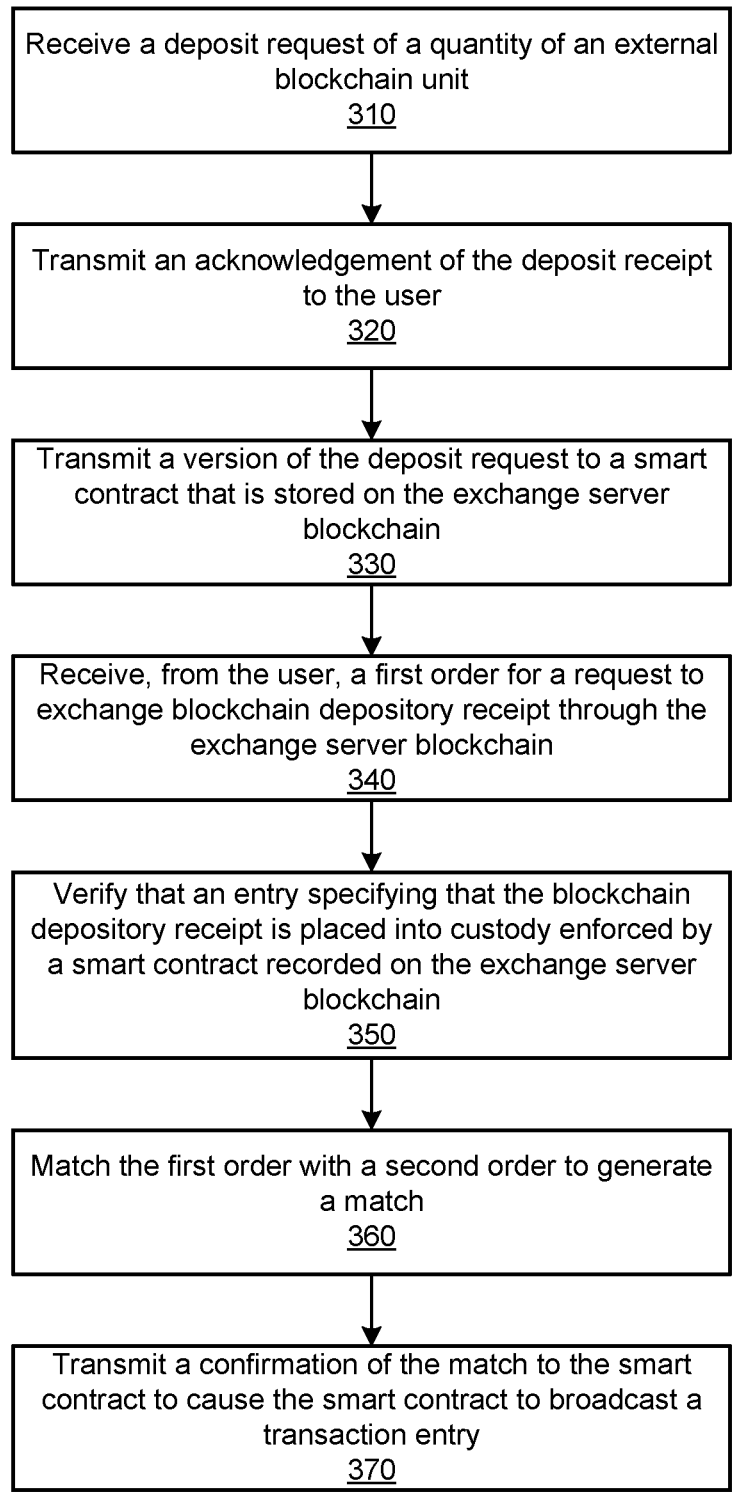
FIG. 3 is a flowchart illustrating an example process in conducting a point-to-point match transaction in a decentralized network, in accordance with an embodiment.

FIG. 3 is a flowchart depicting an example process of carrying out a cross-chain mapping and a point-to-point transaction between two users, in accordance with an embodiment. The users may desire to trade various blockchain units, but the blockchain native to the units may have a slow recordation and confirmation speed. The exchange server 120 may enable a point-to-point matching the orders of the two users and transaction of the blockchain units of an external blockchain 130 through depository receipts that are recorded on the exchange server blockchain 125. The matching of orders may be carried by outside of any blockchain to increase the matching speed. The exchange server blockchain 125 may also have a much higher block-generation speed than the external blockchain 130 so that the transaction may be completed and confirmed in a much higher rate.

By way of example, the exchange server 120 may receive 310 a deposit request of a quantity of an external blockchain unit. The deposit request may take the form of a message that includes the public address of the user on the external blockchain 130 and a digital signature of the user serving as a proof of the user's association with the public address on the external blockchain 130. For instance, the public address of the user may be derived from the user's public key. The user may generate a digital signature using the private key that corresponds to the public key to prove that the user holds the private key and the public address represents the user's address on the external blockchain 130. The deposit request may also specify the quantity of external blockchain unit to be deposited. Based on the public address, the exchange server 120 may verify that the public is associated with sufficient quantity of the external blockchain unit by examining entries recorded on the external blockchain 130 that are associated with the public address.

The exchange server 120 may transmit 320 an acknowledgment of the deposit request to the user. The acknowledgment may include an instruction of the deposit that specifies a deposit address on the external blockchain 130 for the user to send the external blockchain unit. The deposit address may be an address associated with a smart contract that is recorded on the external blockchain 130 or an address of the exchange server 120. Based on the acknowledgment, the user may use its private key to sign a transaction that is broadcasted to the blockchain network of the external blockchain 130. The transaction specifies that a quantity of the blockchain is transferred from the user's public address to the deposit address.

In addition to transmitting the acknowledgment, the exchange server 120 also may transmit 330 a version of the deposit request to a smart contract that is stored on the exchange server blockchain 125. A version of the deposit request may be the deposit request itself, a variation of the deposit request that is converted to a format specified by the smart contract, a summary of the deposit request, or the deposit request with added information. The smart contract, upon receipt of the deposit request, may wait for a confirmation of deposit. When a deposit request is pending, the code instructions of the smart contract may execute instructions to request an oracle machine to provide checking of new blocks that are generated in the external blockchain 130 periodically until the deposit is confirmed or until the deposit request expires. An oracle machine provides a data feed to the smart contract to verify that a transfer of the quantity of the external blockchain unit to a deposit address is recorded on the external blockchain 130. In some embodiments, the smart contract that is recorded on the external blockchain 130 may cause a virtual machine to send a confirmation of the deposit to the smart contract that is recorded on the exchange server blockchain 125. In response and based on the code instructions of the smart contract recorded on the exchange server blockchain 125, the instructions cause a broadcast of a creation of a BCDR on the exchange server blockchain 125. The creation entry may associate the created BCDR with a public address of the user on the exchange server blockchain 125.

The cross-chain deposited blockchain units are available for transactions on the exchange server blockchain 125 through the BCDR. The exchange server 120 may receive 340, from the user, a first order for a request to exchange the BCDR through the exchange server blockchain 125. The BCDR is issued and recorded on the exchange server blockchain 125 as a depository receipt of the external blockchain unit that is recorded on the external blockchain 130. The trade order may specify the quantity of the blockchain unit and the price, which may be expressed in terms of the external blockchain unit. The order may include the public address of the user on the exchange server blockchain 125 so that the exchange server 120 may verify that the order is valid (e.g., whether the user has sufficient quantity of the BCDR).

The exchange server 120 may verify 350 that an entry, which specifies that the BCDR is placed to an address of a smart contract, is recorded on the exchange server blockchain 125. The code instructions of the smart contract may be immutable so that the custody enforced by the smart contract may not be interfered. The transfer of the BCDR to the address of the smart contract represents that the BCDR is in the custody of the smart contract. The smart contract may maintain custody in any suitable way based on the design of the code instructions. In one embodiment, the smart contract may record a custody entry on the exchange server blockchain 125 specifying that the BCDR transmitted from the user's public address is in custody and maintain the entry as the last entry of the BCDR. As a result, the user may not double-spend the BCDR because another transfer of the BCDR will contradict the custody entry. In another embodiment, the smart contract may specify a public address associated with the smart contract. The transfer of the BCDR from the user's address to the smart contract's address results in the custody. The custody is maintained until the smart contract returns the BCDR to the user's address when the trade order expires or transfers the BCDR to another user's address when the trade order is executed.

The exchange server 120 matches 360 the first order with a second order to generate a match based on the price or other conditions of the orders. The exchange server 120 may put verified trade orders in the memory 150. The matching may be performed in a centralized manner to be controlled by the exchange server 120. The matching also may be performed without regard to the recordation or generation of blocks in the exchange server blockchain 125 to increase the matching speed. As such, the exchange server 120 may retrieve the orders in real-time.

When two trade orders are matched, the execution of the orders may be performed in a decentralized manner through the exchange server blockchain 125. In one case, the exchange server 120 transmits 370 a confirmation of the match to the smart contract, which includes the set of code instructions recorded on the exchange server blockchain 125, to cause the smart contract to broadcast a transaction entry. The confirmation may include the trade order identifiers of two trades and also the digital signature of the exchange server 120 to verify the match. The smart contract, in turn, locates the BCDRs that are in custody. After the match is verified by the smart contract, such as by confirming the orders really match and verifying the digital signature of the exchange server 120, the set of code instructions of the smart contract generates a broadcast of a blockchain transaction to be recorded on the exchange server blockchain 125. The blockchain transaction specifies a transfer of the BCDR from the user's address to another blockchain address of the exchange server blockchain 125. The transaction is settled when the transaction has been recorded on the exchange server blockchain 125 and the blocking containing the transaction is linked to multiple subsequent blocks.

Example Exchange Processes

Figure 4:
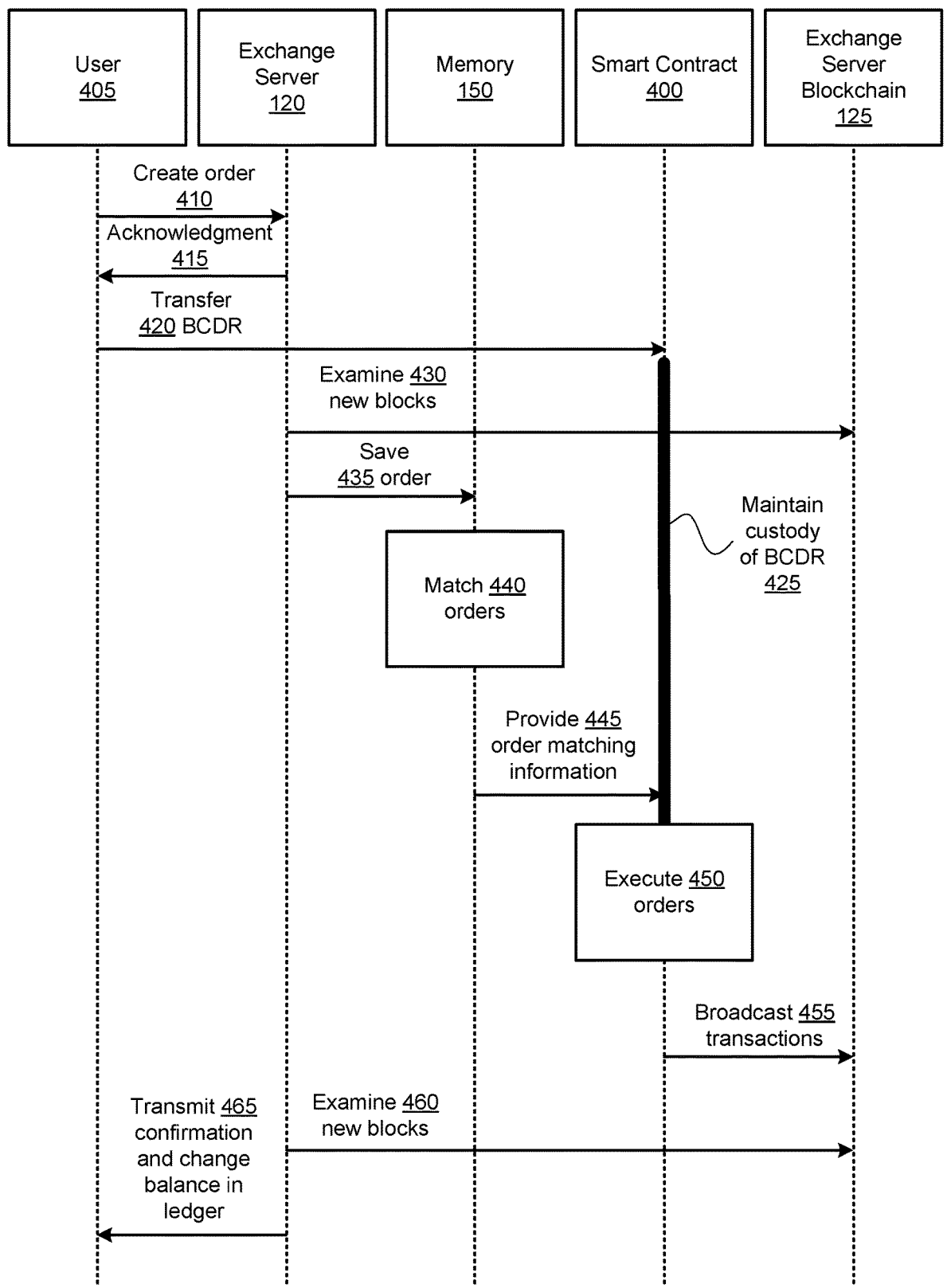
FIG. 4 is a flowchart depicting an example process of exchanging a blockchain unit, in accordance with an embodiment.

FIG. 4 is a flowchart depicting the message and data flow among various entities and components in a transaction of a BCDR, in accordance with an embodiment. FIG. 4 illustrates a process with a user 405, but multiple similar processes may occur during similar time frames. Other processes may occur in a similar manner.

A user 405 of the exchange server 120 may hold various types of blockchain depository receipts that represent different underlying assets. The user 405 may exchange assets using BCDRs through the exchange server 120 so that the assets may be settled in a secured and decentralized manner at a speed that is often significantly faster than platforms (e.g., an external blockchain) or institutes that hold the assets. In one embodiment, the exchange server 120 may provide pricing information such as price quotes of various assets in different units. For example, for an asset such as a security, the price quote may be both in fiat currency and in a unit of a blockchain token such as a cryptocurrency. In another example, for an asset such as a cryptocurrency, the price quote may be both in the unit of the BCDR representing the cryptocurrency and in the unit of the cryptocurrency.

The user 405 may use a first BCDR that represents an external blockchain token to purchase an asset that is represented as a second BCDR. The user 405 may issue an operation request. For example, to initiate the exchange, the user 405 creates an order 410, which may include the price and quantity of the asset that the user 405 wants to purchase and the quantity of the first BCDR used to purchase the asset. The quantity of the first BCDR may also be expressed, for example, in a unit of an external blockchain token that is represented by the first BCDR. The exchange server 120 may transmit an acknowledgment 415 to the user 405 indicating the exchange server 120 is in receipt of the order 410. The acknowledgment 415 may include a unique identifier identifying the order and a custody address on the exchange server blockchain 125 for the user 405 to put the first BCDR into custody that is enforced by the code instructions of a smart contract. The custody address may be an address associated with and controlled by the smart contract 400.

Upon receipt of the custody address, the user 405 transfers 420 the first BCDR to the smart contract 400. For example, the digital wallet of the user 405 may use the user's private key to sign an entry that specifies that the BCDR is transferred to the custody address. The digital wallet may broadcast the entry to the exchange server blockchain 125 for the recordation of the entry. The entry may also specify the conditions of expiration of the order 410 and the duration on custody. The recordation of the transfer of the BCDR to the smart contract 400 indicates that the BCDR is placed into custody enforced by the smart contract 400 that is recorded on the exchange server blockchain. During the pendency of the order 410, the smart contract 400 may maintain 425 the custody of the BCDR pursuant to the order 410, as indicated by the thick vertical line in FIG. 4. For example, since the BCDR is transmitted to a custody address by an entry created by the user 405, the user 405 may not double-spend the BCDR without the smart contract 400 returning the BCDR to the user's address by broadcasting another entry on the exchange server blockchain 125. The code instructions in the smart contract 400 may maintain 425 the custody pursuant to the order 410, such as based on the conditions of expiration specified in the order 410 or based on predetermined conditions if the order 410 does not include such information.

The exchange server 120 may routinely examine new blocks 430 generated at the exchange server blockchain 125. The examination of the new blocks verifies whether the entry, which specifies that the BCDR is placed into custody maintained by the smart contract 400, is recorded on the exchange server blockchain. The verification may also check whether the conditions of expiration provided to the exchange server 120 matches the conditions provided to the smart contract 400. In response to the verification, the exchange server 120 saves 435 the order 410 to the memory 150 along with other orders that are placed by various users of the exchange server 120. The order 410 may be an operation request.

The exchange server 120 matches 440 the order 410 with a second order to generate a match. If the order 410 is not matched for a predetermined amount of time or for a time or condition specified in the user 405, the order 410 is expired and the smart contract 400 returns the BCDR to the user 405 from custody. If a match is generated, the exchange server 120 provides 445 order matching information to the smart contract 400 by transmitting a confirmation of the match to the smart contract 400 through the data feed of the smart contract 400 such as an oracle machine. The confirmation may include a digital signature of the exchange server 120 to verify the authenticity of the confirmation. For example, the exchange server 120 may create a message that includes the information of the match, such as the identifiers of the two orders, quantity and prices of the BCDR involved, and the identifiers of the users involved in the transaction. The exchange server 120 uses its private key to encrypt the message to create a digital signature. The confirmation may include the message in plaintext and the digital signature. Upon generation of the match, the exchange server 120 may also publish the match at a source that is separated from the exchange server blockchain 125. For example, the exchange server 120 may publish some of the identification information of the match on a website (e.g., a website of the exchange server 120) or other make the information available through an API. The publication serves as an independent source regarding the match. The published information may be anonymized. For example, in one embodiment, the user identifier may be removed. The published information may include the BCDR identifier, the quantity of the BCDRs being traded, the timestamp of the match, etc. The published information may also be hashed.

The set of code instructions of the smart contract 400 executes 450 the orders based on the match upon the verification of the confirmation. For example, the smart contract 400 may use the public key of the exchange server 120 to decrypt the digital signature to generate another copy of the plaintext of the message. The smart contract 400 compares the generated copy to the copy of the message included in the confirmation to verify that the match included in the confirmation is truly sent by the exchange server 120. The smart contract 400 may also further twice verify the information by comparing the information to the published information that is posted on another source that is separated from the exchange server blockchain 125.

The smart contract executes 450 the orders by exchanging the ownerships of the BCDRs between the two users in the match. The set of code instruction may generate an entry of a blockchain transaction. The blockchain transaction specifies a transfer of the blockchain depository receipt from the address of the user 405 to another blockchain address of the exchange server blockchain 125 that is associated with a second user. The same transaction or a separate entry may also specify that the assets intended to be acquired by the user 405 to be transferred to the blockchain address of the user 405. The smart contract may also calculate the transaction fees of the match. The transaction fees may be deduced from the BCDR in custody and be transmitted to an address of the payee of the transaction fee through the recordation of an entry in the blockchain. The address of the payee may be the address of the exchange server 120.

The smart contract 400 broadcasts 455 the transactions to the network of the exchange server blockchain 125 for the transactions to be recorded on the blockchain. The exchange server 120 may examine 460 new blocks that are generated on the exchange server blockchain 125. After the recordation of the transactions on the blockchain is confirmed, the exchange server 120 may transmit 465 a confirmation of the order to user 405 and reflect the change in the balance of the user's account in the ledger associated with the user 405.

Example Cross-Chain Deposit Process

Figure 5:
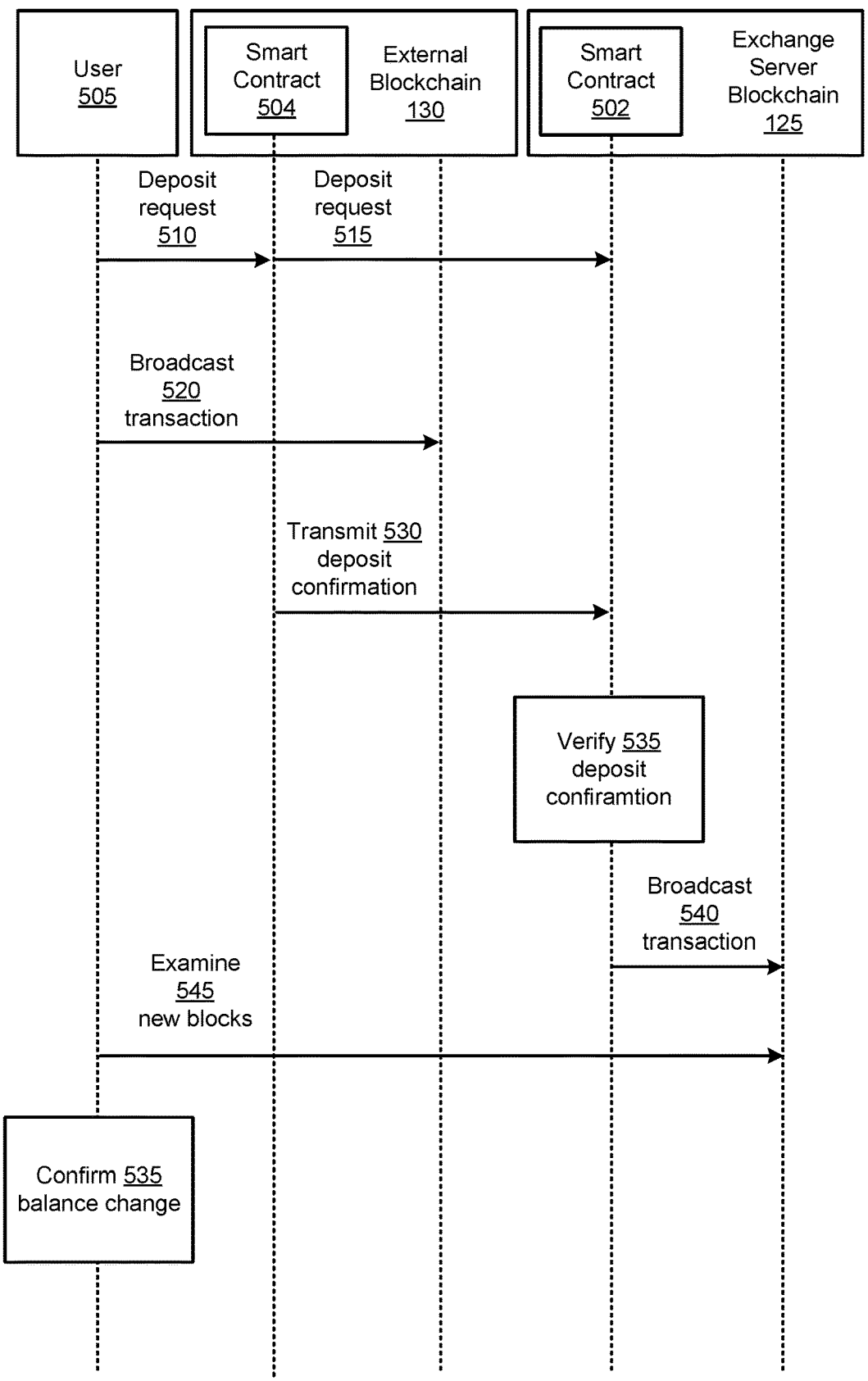
FIG. 5 is a flowchart depicting an example process of creating a depository receipt for an external blockchain unit, in accordance with an embodiment.

FIG. 5 is a flowchart depicting data and message flow in an example process of a cross-chain deposit process, in accordance with an embodiment. The deposit process may allow an external blockchain unit recorded on an external blockchain 130 to be represented by depository receipts and be traded on the exchange server blockchain 125. This enables the external blockchain units to be benefitted from various advantages of the exchange server blockchain 125, such as high transaction and confirmation throughput and quick matching of orders. In general, the exchange server 120 or any suitable party may design and record a smart contract 502 on the exchange server blockchain 125 and another smart contract 504 on the external blockchain 130. The parties that recorded the smart contract 502 and smart contract 504 may be the same party or different party, and also may be the exchange server 120, another exchange server, or any party. In general, in a deposit process, the smart contract 504 receives a deposit request of a quantity of an external blockchain unit from a user 505. The smart contract 502 may also receive the deposit request. The smart contract 502, in turn, verifies that a transfer of the quantity of the external blockchain unit to a deposit address is recorded on the external blockchain 130. Upon the verification, the smart contract 502 causes a broadcast of a creation of a BCDR on the exchange server blockchain 125 to represent the deposited quantity of the external blockchain unit. The smart contract 502 in FIG. 5 may or may not be the same smart contract 400 in FIG. 4.

The deposit process shown in FIG. 5 may be completed between two smart contracts 502 and 504 in a completely de-centralized manner or in a semi-decentralized manner. For example, in one embodiment, the communications between the two smart contracts 502 and 504 may be conducted directly between two contracts through any suitable cross-chain communication protocols between the two blockchains 125 and 130. In another embodiment, the communications on one or both ends of the smart contracts 502 and 504 may be conducted through one or more oracle machines. In yet another embodiment, the communications between the smart contracts 502 and 504 may be facilitated through a centralized server, such as the exchange server 120. For example, a server may monitor the entries recorded in both blockchains 125 and 130 and forward relevant entries or communications from one blockchain 125 or 130 to the smart contract 502 or 504 recorded on another blockchain 125 or 130.

By way of example of a deposit process, a user 505 may transmit a deposit request 510 of an asset such as a blockchain unit to smart contract 504. The user 505 may represent the user and any software applications that the user used to complete the deposit process. One possible software application may be an application that is published by the exchange server 120, but other software applications that are unrelated to the exchange server 120 may also be used. The deposit request 510 may include a value specifying the request and additional information such as an identifier of the asset and the quantity of the asset. The deposit request 510 may be in a format that is compatible to the conditions set forth in the code instructions of smart contract 504 in order to trigger the smart contract 504. In various embodiment, the deposit request 510 may include different, fewer, or additional identification information.

The smart contract 502 may also receive a version of the deposit request 515, which may be sent directly from the user 505, transmitted through an oracle machine, forwarded by the exchange server 120, or forwarded by the smart contract 504. A version of the deposit request 515 may be the deposit request 510 itself, a summary of the deposit request 510, the deposit request in a converted format that is compatible to the smart contracts 502, or the deposit request with added information. The version of deposit request 515 may include a unique identifier of the user 505 to the smart contract 502. The identifier may be an address of the user 515 on the exchange server blockchain 125. Example unique account identifier may also include the user account's public blockchain address, a version of the user account's public key, a hash of the user account name, the account name itself, or any other suitable unique identifier. For example, a version of the user account's public key may be an encoded version of the public key or a variation of the public key. The public key may be hashed, checksummed, supplemented with a header, etc.

Each of the deposit requests 510 and 515 may be associated with a fingerprint. For example, the fingerprint may be associated with the identification information of the deposit request 510. The identification information of the deposit request 510 may be hashed to serve as the fingerprint. The hashing process may include applying a one-way function to the identification information to a fixed-length hash. Common hashing algorithms such as secure hash algorithms (SHA) or message digest algorithms (MD) may be used. The hashing process may also include creating a checksum, encoding some of the bits, adding prefixes or suffixes, etc. In one embodiment, in generating the fingerprint, the user 505 also may use its private key or its own secret to encrypt the fingerprint so that the fingerprint can be generated only by the user 505. The fingerprint may be used as the identifier of the deposit request 510. The identification information in the fingerprint may also include a user account identifier of the exchange server 120 and/or a blockchain address of the user on the exchange server blockchain 125.

Based on the address of the smart contract 504, the user creates an entry of a transaction for the transfer of the quantity of external blockchain unit and broadcasts 520 the entry of the transaction to the network of external blockchain 130. The entry may include a digital signature of the user 505. For example, the user 505 may use her private key to encrypt a previous entry in which the user receives the external blockchain unit. In one embodiment, the user 505 also may use her private key to encrypt the deposit request 510 and/or the fingerprint of the deposit request 510 and include the encrypted message as part of a digital signature that is included in the entry. The entry may include both the plaintext of the fingerprint of the deposit request 510 and the ciphertext of the fingerprint as a part of the user's digital signature. The user 505 broadcasts 520 the entry to the network of external blockchain 130 for the transaction to be recorded on the external blockchain 130. The entry specifies a transfer of the external blockchain unit to the smart contract 504.

After the entry broadcasted by the user 505 is recorded on the external blockchain 130, the external blockchain unit is transferred from the user 505 to the blockchain address of the smart contract 504. The deposit may be confirmed on the external blockchain 130. The smart contract 504 may result in a transmission 530 of the deposit confirmation to the smart contract 502 that is recorded on the exchange server blockchain 125.

Various suitable ways may be used to cause the transmission of the deposit confirmation. In one embodiment, the two smart contracts 502 and 504 may communicate through a suitable cross-chain protocol. The smart contract 504 may transmit the deposit confirmation to the smart contract 502 through the cross-chain protocol. In another embodiment, the smart contract 504 and the smart contract 502 may be communicated through an oracle machine. In yet another embodiment, a centralized server (e.g., exchange server 120) may check for an entry that includes the fingerprint of the deposit request. After the deposit confirmation is shown in one of the entries in the external blockchain 130, the server may forward the information of the deposit confirmation to the smart contract 502.

The smart contract 502 may verify 535 the deposit confirmation. For example, the smart contract 502 may have already received the fingerprint of the deposit request 510 that may be included in the version of deposit request 515. The smart contract 502, upon receipt of the deposit request 515, may cause a virtual machine on the network of exchange server blockchain 125 to routinely check the entries recorded in the external blockchain 130 until the entry related to the deposit request is found or until timeout (e.g., time expiration of the deposit request). The smart contract 502 verifies the information included in the identification information in the deposit request 510. In some embodiments, the smart contract 502 may verify the digital signature of the user 505. The smart contract 502 may also verify the quantity of the external blockchain unit being deposited. In another embodiment, the verification may be performed with the help of a centralized server (e.g., the exchange 120). For example, a server may verify the entries recorded on the external blockchain 130 and may send an authorization along with the deposit entry to the smart contract 502. Depending on the implementation and code instructions in the smart contract 502, the server's authorization may serve as validation. In other cases, to maintain the deposit process to be as decentralized as possible, the smart contract 502 may verify the deposit entry without the involvement of a centralized server.

In response to a successful verification, the smart contract 502 creates an entry that specifies a transaction to create a BCDR to represent the quantity of the external blockchain unit deposited. The entry may also include metadata of the creation of the BCDR. In one embodiment, the BCDR may be created in accordance with a namespace convention of the exchange server blockchain 125. If the BCDR is restricted to be only exchangeable in the exchange server 120, the namespace may be reserved for the exchange server 120 so that the BCDR may only be valid for the trade and transaction through the exchange server 120. In some embodiment, the enforcement of the namespace convention allows the exchange server 120 to restrict the trading of the BCDR so that the created BCDR, in one embodiment, may only be traded through the exchange server 120. For example, an object class may be created and recorded in association with the smart contract 502. An example of the blockchain unit class is shown below:

```
#include <dcclib/token.hpp> // Token usage
......
namespace AE {
    void token::create( account_name issuer,
        asset                 maximum_supply,
        uint8_t               issuer_can_freeze,
        uint8_t               issuer_can_recall,
        uint8_t               issuer_can_whitelist) {
        ......
    }
    ......
    // Additional codes here
}
```

The smart contract broadcasts 540 the transaction to the network of the exchange server blockchain 125 for the recordation of the entry. The transaction may include a transfer of the BCDR to an address on the exchange server blockchain 125 that is associated with the user 505. The user 505 may examine 545 new blocks that are generated on the exchange server blockchain 125. After the recordation of the transaction on the blockchain is confirmed, a digital wallet of the user 505 may confirm 535 the balance change to reflect the change in blockchain units in the ledger associated with the user 505.

In some embodiments, the BCDRs generated are divisible into a plurality of portions. Each portion may be independently tradable by the user to sell the portion to a different user of the exchange server 120. For example, a BCDR may represent 10 ETH in an external blockchain. The owner of the BCDR may sell 1/10 of the BCDR, which represents a single unit of ETH, to a first buyer and the rest of the BCDR to a second buyer. In some cases, the BCDR may represent a unit of an external blockchain unit. The BCDR is still divisible so that users may trade a portion of the unit.

Example Redemption Process

Figure 6:
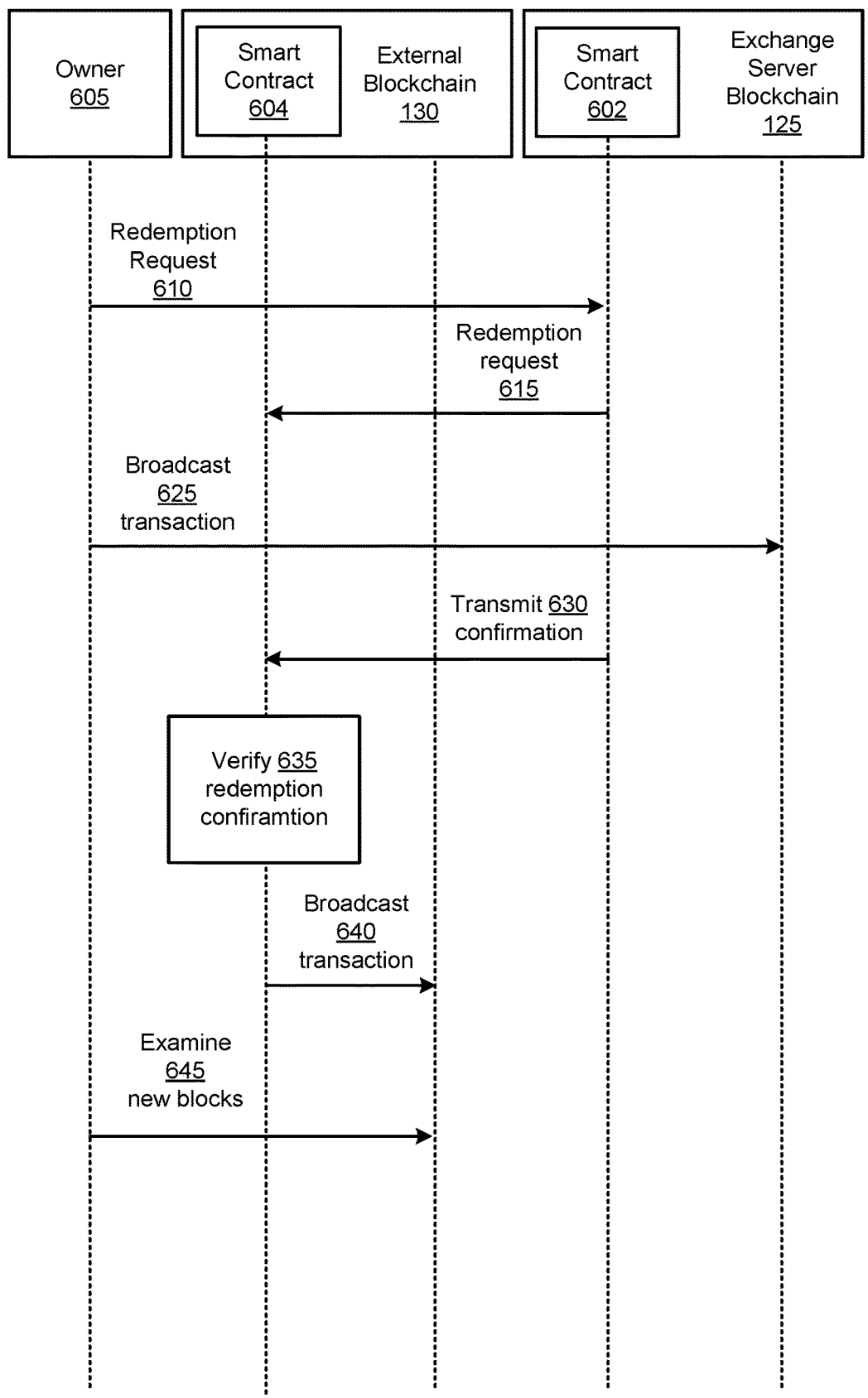
FIG. 6 is a flowchart depicting an example process of redeeming an external blockchain unit, in accordance with an embodiment.

FIG. 6 is a flowchart depicting data and message flow in an example process of redeeming an external blockchain unit using a BCDR, in accordance with an embodiment. The redemption process allows users to convert their BCDRs to other assets such as an external blockchain unit. In FIG. 6, the user who redeems the external blockchain units may be referred to as an owner 605. The exchange server 120 or any suitable party may design and record a smart contract 602 on the exchange server blockchain 125 and another smart contract 604 on the external blockchain 130. The smart contracts 602 and 604 may respectively be the smart contracts 502 and 504 or may be different smart contracts. In a redemption process, the smart contract 602 receives a redemption request of the BCDR from an owner. The smart contract 604 may also receive a version of the redemption request. The smart contract 604 verifies that a transfer of the BCDR to an address associated with the smart contract 602 is recorded on the exchange server blockchain 125. Upon verification, the smart contract 604 causes a broadcast of a transfer of a quantity of the external blockchain unit to the owner's address on the external blockchain 130.

Similar to the deposit process in FIG. 5, the redemption process 6 may be completed between two smart contracts 602 and 604 in a completely de-centralized manner or in a semi-decentralized manner. For example, in one embodiment, the communications between the two smart contracts 602 and 604 may be conducted directly between two contracts through any suitable cross-chain communication protocols between the two blockchains 125 and 130. In another embodiment, the communications on one or both ends of the smart contracts 602 and 604 may be conducted through one or more oracle machines. In yet another embodiment, the communications between the smart contracts 602 and 604 may be facilitated through a centralized server, such as the exchange server 120. For example, a server may monitor the entries recorded in both blockchains 125 and 130 and forward relevant entries or communications from one blockchain 125 or 130 to the smart contract 602 or 604 recorded on another blockchain 125 or 130.

By way of example of a redemption process, the owner 605 may transmit a redemption request 610 for an asset, such as an external blockchain unit, to the smart contract 602. The redemption request 610 may include a value specifying the request and additional information such as an identifier of the asset and the quantity of the asset. The redemption request 610 may also include an address of the external blockchain 130 to which the redeemed assets should be sent. In some cases, the redemption request 610 may also include an identifier of the owner's account at the exchange server 120. In various embodiment, the redemption request 610 may include different, fewer, or additional identification information.

The smart contract 604 may receive a version of the redemption request 615, which may be transmitted through an oracle machine, forwarded by the exchange server 120, or forwarded by the smart contract 602. A version of the redemption request may be the redemption request 610 itself, a summary of the redemption request, the redemption request in a converted format that is compatible to the smart contracts 602 and 604, or the redemption request with added information. The information and format of the redemption request 610 and its related version 615 are similar to those of the deposit request 515 as discussed with reference to FIG. 5.

Based on the address of the smart contract 602, the owner creates an entry of a transaction for the transfer of BCDR and broadcasts 625 the entry of the transaction to the network of the exchange server blockchain 125. The entry may include a digital signature of the owner 605. For example, the owner 605 may use her private key to encrypt a previous entry in which the owner receives the BCDR. In one embodiment, the owner 605 also may use her private key to encrypt the fingerprint of the redemption request 610 and include the encrypted message as part of a digital signature that is included in the entry. The entry may include both plaintext and ciphertext of the fingerprint of the redemption request 610. The owner 605 broadcasts 625 the entry to the network of the exchange server blockchain 125 for the transaction to be recorded on the exchange server blockchain 125. The entry specifies a transfer of the BCDR to the smart contract 602.

After the entry broadcasted by the owner 605 is recorded on the exchange server blockchain 125, the BCDR is transferred to the blockchain address of the smart contract 602. The transfer may be confirmed on the exchange server blockchain 125. The smart contract 602 may result in a transmission 630 of the redemption confirmation to the smart contract 604 that is recorded on the external blockchain 130.

Various suitable ways may be used to cause the transmission of the redemption confirmation. In one embodiment, the two smart contracts 602 and 604 may communicate through a suitable cross-chain protocol. The smart contract 602 may transmit the redemption confirmation to the smart contract 604 through the cross-chain protocol. In another embodiment, the smart contract 602 and the smart contract 604 may be communicated through an oracle machine. In yet another embodiment, a centralized server (e.g., exchange server 120) may check for an entry that includes the fingerprint of the redemption request. After the redemption confirmation is shown in one of the entries in the exchange server blockchain 125, the server may forward the information of the redemption confirmation to the smart contract 604.

The smart contract 604 may verify 635 the redemption confirmation. For example, the smart contract 604 may have already received the fingerprint of the redemption request 610 that may be included in the version of redemption request 615. The smart contract 604, upon receipt of the redemption request 615, may cause a virtual machine on the network of external blockchain 130 to routinely check the entries recorded in the exchange server blockchain 125 until the entry related to the redemption request is found or until timeout (e.g., time expiration of the redemption request). The smart contract 604 verifies the information included in the identification information in the redemption request 610. In some embodiments, the smart contract 604 may verify the digital signature of the owner 605. The smart contract 604 may also verify the quantity of the external blockchain unit being redeemed. In another embodiment, the verification may be performed with the help of a centralized server (e.g., the exchange 120). For example, a server may verify the entries recorded on the exchange server blockchain 125 and may send an authorization along with the redemption entry to the smart contract 604. Depending on the implementation and code instructions in the smart contract 604, the server's authorization may serve as validation. In other cases, to maintain the redemption process to be as decentralized as possible, the smart contract 604 may verify the redemption entry without the involvement of a centralized server.

In response to a successful verification, the smart contract 604 creates an entry that specifies a transaction to transfer the quantity of the external blockchain unit requested by the owner from the address of the smart contract 604 to the owner's address that may be specified in the redemption request 610. The smart contract 604 broadcasts 640 the transaction to the network of the external blockchain 130 for the recordation of the entry. The owner 605 may examine 645 new blocks that are generated on the external blockchain 130 to confirm that the redemption process is completed.

Example Blockchain Architecture

Figure 7A:
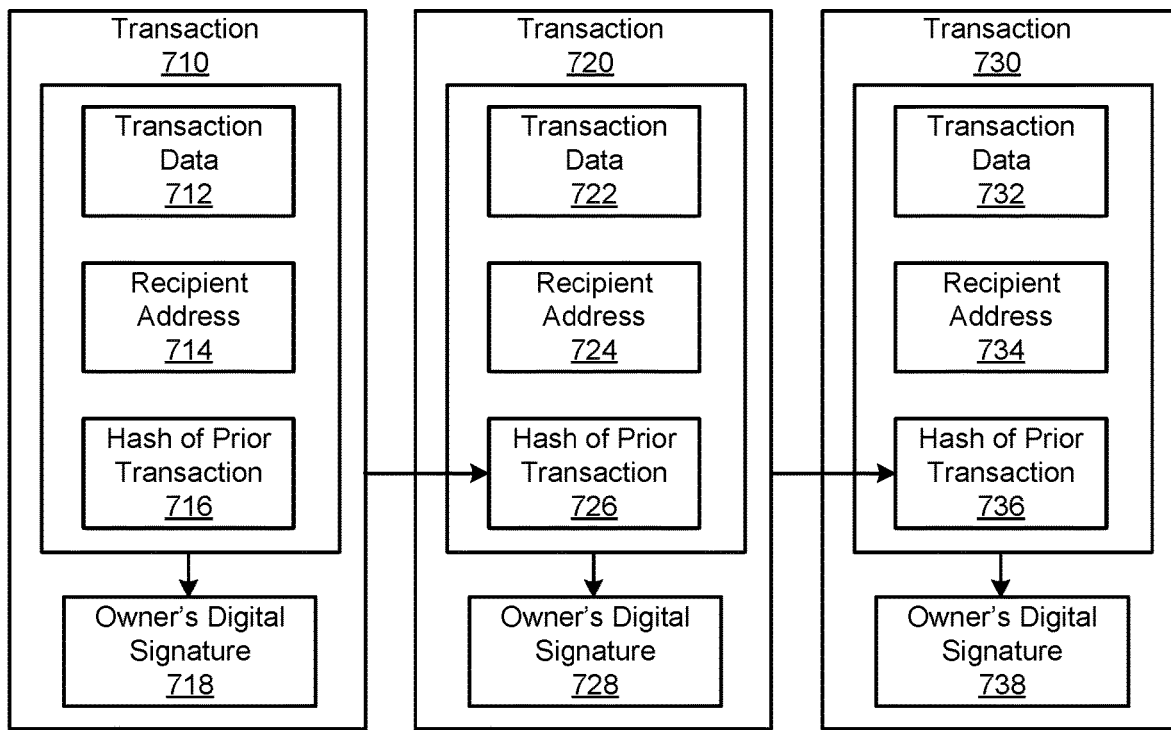
FIG. 7A is a block diagram illustrating a chain of transactions recorded on a blockchain, in accordance with an embodiment.

FIG. 7A is a block diagram illustrating a chain of transactions broadcasted and recorded on a blockchain, in accordance with an embodiment. The transactions described in FIG. 7A may correspond to any of the transactions and the transfer of a blockchain unit (e.g., an electronic coin, a blockchain token, a BCDR, etc.) described in previous figures.

In some embodiment, a blockchain is a distributed system. A distributed blockchain network may include a plurality of nodes. Each node is a user or a server that participates in the blockchain network. In a completely public blockchain, any participant may become a node of the blockchain. The nodes collectively may be used as a distributed computing system that serves as a virtual machine of the blockchain. In some embodiments, the virtual machine or a distributed computing system may be simply referred to as a computer. The nodes in a blockchain network may run an instance of the virtual machine, which allows the nodes to agree on the execution of the same instructions. Any users of a public blockchain may broadcast transactions for the nodes of the blockchain to record. Each user's digital wallet is associated with a cryptographic private key that is used to sign transactions and prove the ownership of a blockchain unit.

A blockchain may include one or more smart contracts that include code instructions to enable the operations of one or more decentralized applications. A decentralized application may run on a decentralized blockchain network and executes code instructions through one or more virtual machines. A smart contract may be a collection of code instructions that may be executed when a condition is met. A smart contract may also include data and an address that allows users to transfer blockchain units to the smart contract for the execution of one or more actions associated with the blockchain units. A computer, such as a virtual machine that uses the resources of one or more nodes on the blockchain network, may execute the code instruction of the smart contracts.

The ownership of a blockchain unit may be traced through a chain of transactions. In FIG. 7A, a chain of transactions may include a first transaction 710, a second transaction 720, and a third transaction 730, etc. Each of the transactions in the chain may have a fairly similar structure except the very first transaction in the chain. The first transaction of the chain may be generated by a smart contract and may be traced back to the smart contract that is recorded on the blockchain. While each transaction is linked to a prior transaction in FIG. 7A, the transaction does not need to be recorded on consecutive blocks on the blockchain. For example, the block recording the transaction 710 and the block recording the transaction 720 may be separated by hundreds or even thousands of blocks. The traceback of the prior block is tracked by the hash of the prior block that is recorded by the current block.

Referring to one of the transactions in FIG. 7A, for illustration, the transaction 720 may be referred to as a current transaction. Transaction 710 may be a prior transaction and transaction 730 may be referred to a subsequent transaction. Each transaction includes a transaction data 722, a recipient address 724, a hash of the prior transaction 726, and the current transaction's owner's digital signature 728. The transaction data 722 records the substance of the current transaction 720. For example, the transaction data 722 may specify a transfer of a quantity of a blockchain unit (e.g., an electronic coin, a blockchain token, a BCDR, etc.). In some embodiments, the transaction data 722 may include code instructions of a smart contract.

The recipient address 724 is a version of the public key that corresponds to the private key of the digital wallet of the recipient. In one embodiment, the recipient address 724 is the public key itself. In another embodiment, the recipient address 724 an encoded version of the public key through one or more functions such as some deterministic functions. For example, the generation of the recipient address 724 from the public key may include hashing the public key, adding a checksum, adding one or more prefixes or suffixes, and encoding the resultant bits. The recipient address 724 may be a unique identifier of the digital wallet of the recipient on the blockchain.

The hash of the prior transaction 726 is the hash of the entire transaction data of the prior transaction 710. Likewise, the hash of the prior transaction 736 is the hash of the entire transaction data of the transaction 720. The hashing of the prior transaction 710 may be performed using a hashing algorithm such as a secure hash algorithm (SHA) or a message digest algorithm (MD). In some embodiments, the owner corresponding to the current transaction 720 may also use the public key of the owner to generate the hash. The hash of prior transaction 726 provides a traceback of the prior transaction 710 and also maintains the data integrity of the prior transaction 710.

In generating a current transaction 720, the digital wallet of the current owner of the blockchain unit uses its private key to encrypt the combination of the transaction data 722, the recipient address 724, and the hash of prior transaction 726 to generate the owner's digital signature 728. To generate the current transaction 720, the current owner specifies a recipient by including the recipient address 724 in the digital signature 728 of the current transaction 720. The subsequent owner of the blockchain unit is fixed by the recipient address 724. In other words, the subsequent owner that generates the digital signature 738 in the subsequent block 730 is fixed by the recipients address 724 specified by the current transaction 720. To verify the validity of the current transaction 720, any nodes in the blockchain network may trace back to the prior transaction 710 (by tracing the hash of prior transaction 726) and locate the recipient address 714. The recipient address 714 corresponds to the public key of the digital signature 728. Hence, the nodes in the blockchain network may use the public key to verify the digital signature 728.

The transfer of ownership of a blockchain unit may continue by the owner of the blockchain unit. To transfer the ownership, the owner may broadcast the transaction that includes the digital signature of the owner and a hash of the prior transaction. A valid transaction with a verifiable digital signature and a correct hash of the prior transaction will be recorded on a new block of the blockchain through the mining process.

Figure 7B:
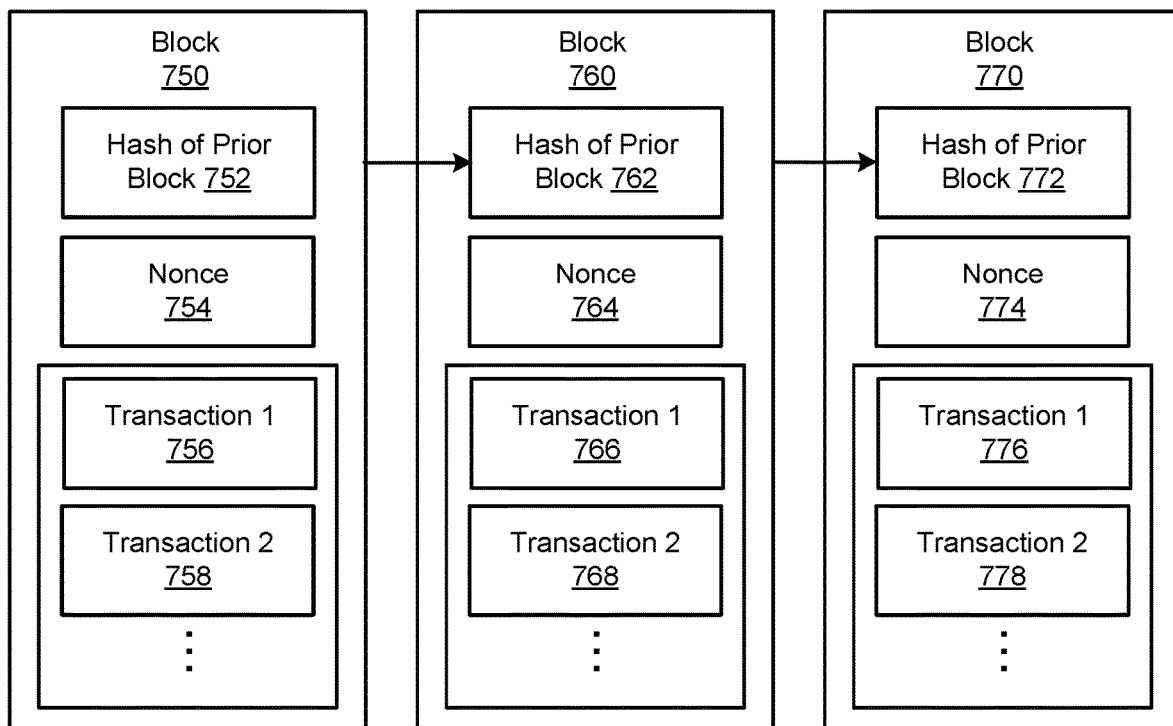
FIG. 7B is a block diagram illustrating a connection of multiple blocks in a blockchain, in accordance with an embodiment.

FIG. 7B is a block diagram illustrating a connection of multiple blocks in a blockchain, in accordance with an embodiment. Each block of a blockchain, except the very first block which may be referred to as the genesis block, may have a similar structure. The blocks 750, 760, and 760 may each include a hash of the prior blockchain 752, a nonce 754, and a plurality of transactions (e.g., a first transaction 756, a second transaction 758, etc.). Each transaction may have the structure shown in FIG. 7A.

In a block generation process, a new block may be generated through mining or voting. For example, in one embodiment, the external blockchain 130 may generate blocks through a mining process while the exchange server blockchain 125 may generate blocks through a voting process. Yet, in other embodiments, the external blockchain 130 and the exchange server blockchain 125 may both use a voting or mining process to generate blocks.

For a mining process of a blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may require a certain format in the hash of prior block in order for the new block to be recognized by the nodes as valid. For example, in one embodiment, the hash of the prior block needs to start with a certain number of zeroes in the hash. Other criteria of the hash of the prior block may also be used, depending on the implementation of the blockchain.

In a voting process, the nodes in a blockchain system may vote to determine the content of a new block. Depending on the embodiment, a selected subset of nodes or all nodes in the blockchain system may participate in the votes. When there are multiple candidates new blocks that include different transactions are available, the nodes will vote for one of the blocks to be linked to the existing block. The voting may be based on the voting power of the nodes. In one embodiment, the nodes may have equal voting power in each round. In another embodiment, one or more voting tokens may be distributed to one or more nodes. The holders of the voting tokens in a particular round may have the voting power or have more voting power for the round. After one or more rounds, the voting tokens may be passed to other nodes. For example, the passing of the voting tokens may be determined randomly, semi-randomly, or in a predetermined fashion. The use of a voting process to generate a block, which is also a decentralized process, may allow a large number of transactions to be recorded in a short period of time and avoid the delay in the mining process.

By way of example of a block generation process using mining, in generating the hash of prior block 762, a node may randomly combine a version of the prior block 750 with a random nonce to generate a hash. The generated hash is somewhat a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries another random nonce to generate another hash. The process is repeated for different nodes in the blockchain network until one of the nodes find a hash that satisfies the criteria. The nonce that is used to generate the satisfactory hash is the nonce 764. The node that first generates the hash 762 may also select what transactions that are broadcasted to the blockchain network is to be included in the block 760. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., a gas) for having the transaction recorded. After the transactions are selected and the data of the block 760 is fixed, the nodes in the blockchain network repeat the trial and error process to generate the hash of prior block 772 by trying different nonce. In embodiments that use voting to generate new blocks, a nonce may not be needed. A new block may be linked to the prior block by including the hash of the prior block.

New blocks may be continued to be generated through the block generation process. A transaction of a blockchain unit (e.g., an electronic coin, a blockchain token, a BCDR, etc.) is complete when the broadcasted transaction is recorded on a block. In some embodiment, the transaction is considered settled when the transaction is multi-verified. A transaction is multi-verified when there are multiple subsequent blocks generated and linked to the block that records the transaction.

In some embodiments, some of the transactions 756, 758, 766, 768, 776, 778, etc. may include one or more smart contracts. The code instructions of the smart contracts are recorded may be recorded on the block and are often immutable. When conditions are met, the code instructions of the smart contract are triggered. The code instructions may cause a computer (e.g., a virtual machine of the blockchain) to carry out some actions such as generating a blockchain unit and broadcasting a transaction documenting the generation to the blockchain network for recordation.

Computing Machine Architecture

Figure 8:
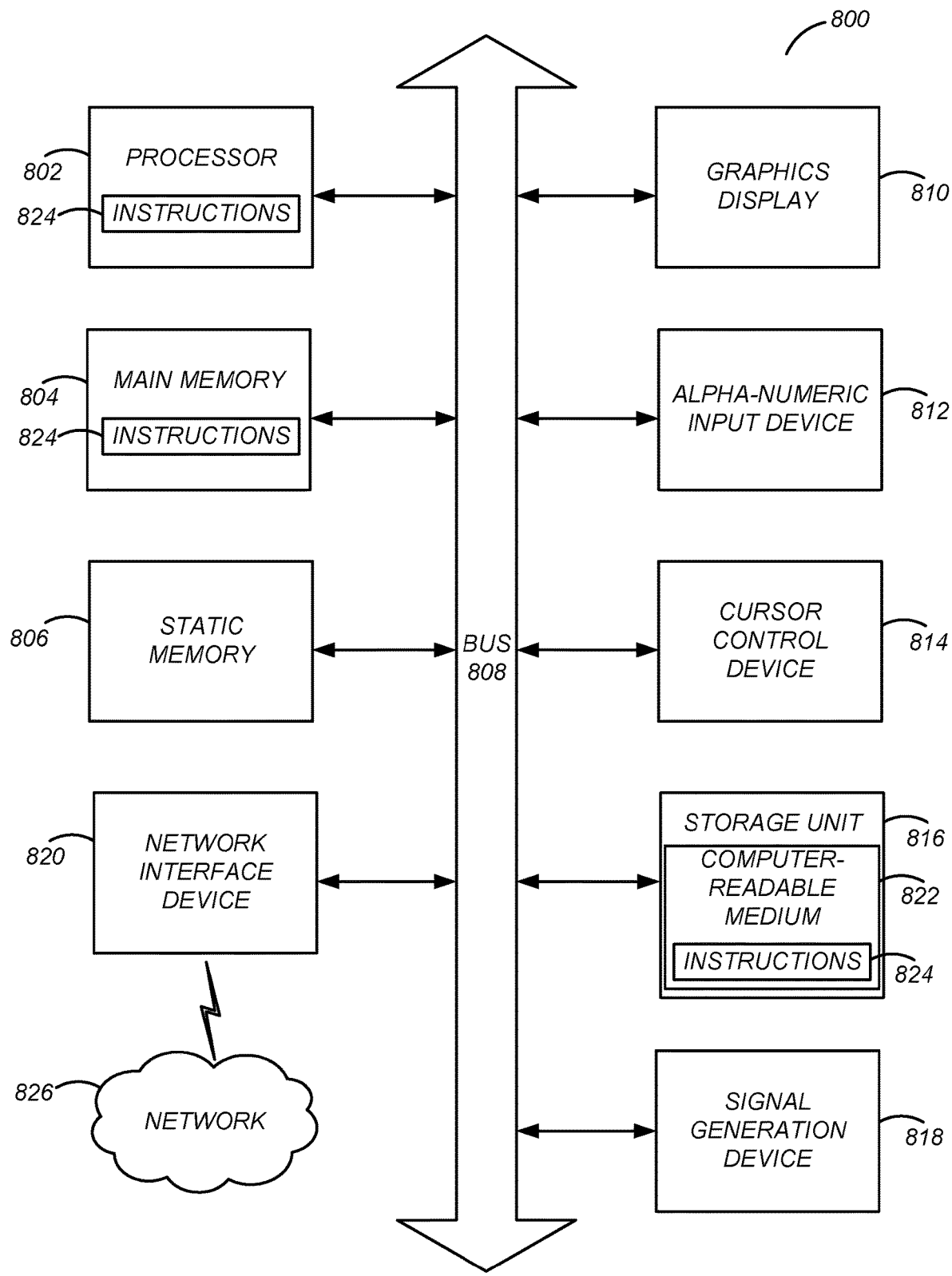
FIG. 8 is a block diagram illustrating an example computing device, in accordance with an embodiment.

FIG. 8 is a block diagram illustrating components of an example computing machine that is capable of reading instructions from a computer-readable medium and execute them in a processor (or controller). A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to, the user device 110, the exchange server 120, a node of a blockchain network, and various engines, interfaces, terminals, and machines shown in FIG. 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an interne of things (IoT) device, a switch or bridge, or any machine capable of executing instructions 824 that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors (generally, processor 802) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

Certain embodiments are described herein as including logic or a number of components, engines, modules, or mechanisms, for example, as illustrated in FIG. 2. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A computer-implemented method, comprising:
   receiving, from a user, a first order for a request to exchange a blockchain depository receipt through a first blockchain, the blockchain depository receipt recorded on the first blockchain as a depository receipt of an external blockchain unit that is recorded on an external blockchain, wherein the first blockchain is separate from the external blockchain, and wherein the first blockchain is a public blockchain to enable the exchange server, the user, and other users of the exchange, to examine entries on the first blockchain;

verifying that an entry, which specifies that the blockchain depository receipt is sent to a custody address of a first smart contract, is recorded on the first blockchain, the first smart contract comprising a first set of code instructions that are recorded on the first blockchain, the code instructions maintaining the custody of the blockchain depository receipt pursuant to the first order;

matching, by the exchange server, the first order with a second order to generate a match; and transmitting a confirmation of the match to the first smart contract to cause the code instructions to generate a broadcast of a blockchain transaction to be recorded on the first blockchain, the blockchain transaction specifying a transfer of the blockchain depository receipt from the user's address to another blockchain address of the first blockchain, wherein the blockchain depository receipt is issued on the first blockchain by a second smart contract comprising a second set of instructions recorded on the first blockchain in response to a deposit confirmation sent to the second set of instructions confirming that the external blockchain unit was transferred to a deposit address on the external blockchain.

2. The computer-implemented method of claim 1, wherein the exchange server is centralized.

3. The computer-implemented method of claim 2, wherein the first blockchain is de-centralized.

4. The computer-implemented method of claim 1, wherein the set of code instructions recorded on the first blockchain are immutably stored in the first blockchain.

5. The computer-implemented method of claim 1, wherein the blockchain depository receipt is recorded in accordance with a namespace convention of the first blockchain, the namespace convention is reserved for the exchange server.

6. The computer-implemented method of claim 1, wherein the first order is expressed in terms of a quantity of the external blockchain unit that is generated by the external blockchain.

7. The computer-implemented method of claim 1, wherein the first blockchain generates new blocks by a voting process and the external blockchain generates new blocks by a mining process.

8. The computer-implemented method of claim 1, wherein the blockchain depository receipt is issued by:
receiving a deposit request of a quantity of the external blockchain unit;
transmitting the deposit request to a second smart contract recorded on the first blockchain, wherein the second smart contract verifies that a transfer of the quantity of the external blockchain unit to a deposit address is recorded on the external blockchain, and wherein the smart contract causes a broadcast of a creation of the blockchain depository receipt on the first blockchain.

9. The computer-implemented method of claim 1, wherein the blockchain depository receipt is redeemable by:
receiving a redemption request of the blockchain depository receipt from an owner;
transmitting the redemption request to a second smart contract recorded on the external blockchain, wherein the second smart contract verifies that a transfer of the blockchain depository receipt to an address associated with the first smart contract is recorded on the first blockchain, and wherein the smart contract causes a broadcast of a transfer of a quantity of the external blockchain unit to the owner's address on the external blockchain.

10. A non-transitory computer readable medium storing program codes comprising code instructions recorded on a first blockchain, the code instructions, when executed, cause one or more processors to perform steps comprising:
receiving a blockchain depository receipt to be put into custody, the custody being maintained pursuant to a first order, the first order created by a user for a request to exchange the blockchain depository receipt, the blockchain depository receipt recorded on the first blockchain as a depository receipt of an external blockchain unit that is recorded on an external blockchain, wherein the first blockchain is separate from the external blockchain, and wherein the first blockchain is a public blockchain to enable the exchange server, the user, and other users of the exchange, to examine entries on the first blockchain;
receiving, from the exchange server, a match between the first order and a second order;
generating, responsive to the match, a broadcast of a blockchain transaction to be recorded on the first blockchain, the blockchain transaction specifying a transfer of the blockchain depository receipt from the user's address to another blockchain address of the first blockchain,
wherein the blockchain depository receipt is issued on the first blockchain by a second set of instructions recorded on the first blockchain in response to a deposit confirmation sent to the second set of instructions confirming that the external blockchain unit was transferred to a deposit address on the external blockchain.

11. The non-transitory computer readable medium of claim 10, wherein the exchange server is centralized.

12. The non-transitory computer readable medium of claim 11, wherein the first blockchain is de-centralized.

13. The non-transitory computer readable medium of claim 10, wherein the set of the code instructions is recorded on the first blockchain as a smart contract that is immutably stored in the first blockchain.

14. The non-transitory computer readable medium of claim 10, wherein the first blockchain generates new blocks by a voting process and the external blockchain generates new blocks by a mining process.

15. The non-transitory computer readable medium of claim 10, wherein the code instructions, when executed, further cause the one or more processors to perform additional steps comprising:
receiving a redemption request of the blockchain depository receipt from an owner;
verifying that a transfer of the blockchain depository receipt to a return address is recorded on the first blockchain;
causing a second set of code instructions recorded on the external blockchain to broadcast a transfer of a quantity of the external blockchain unit to the owner's address on the external blockchain.

16. A system, comprising:
an exchange server configured to:
receive, from a user, a first order for a request to exchange a blockchain depository receipt through a first blockchain, the blockchain depository receipt recorded on the first blockchain as a depository receipt of an external blockchain unit that is recorded on an external blockchain, wherein the first blockchain is separate from the external blockchain, and wherein the first blockchain is a public blockchain to enable the exchange server, the user, and other users of the exchange, to examine entries on the first blockchain, verify that an entry, which specifies that the blockchain depository receipt is sent to a custody address, is recorded on the first blockchain, and match the first order with a second order to generate a match; and a set of code instructions in communication with the exchange server, the set of code instructions recorded on the first blockchain, the set of code instructions, when executed, causes one or more processors to:

receive a confirmation of the match from the exchange server, generate a broadcast of a blockchain transaction to be recorded on the first blockchain, the blockchain transaction specifying a transfer of the blockchain depository receipt from the user's address to another blockchain address of the first blockchain, wherein the blockchain depository receipt is issued on the first blockchain by a smart contract recorded on the first blockchain in response to a deposit confirmation sent to the smart contract confirming that the external blockchain unit is transferred on the external blockchain to a deposit address on the external blockchain.

17. The system of claim 16, wherein the exchange server is centralized and the first blockchain is de-centralized.

18. The system of claim 16, wherein the blockchain depository receipt is recorded in accordance with a namespace convention of the first blockchain, the namespace convention is reserved for the exchange server.

* * * * *